United States Patent
Park et al.

(10) Patent No.: US 7,637,626 B2
(45) Date of Patent: Dec. 29, 2009

(54) BACKLIGHT UNIT AND LIQUID CRYSTAL DISPLAY HAVING THE SAME

(75) Inventors: Se-ki Park, Suwon-si (KR);
Seock-hwan Kang, Suwon-si (KR);
Gi-cheri Kim, Yongin-si (KR);
Seok-hyun Nam, Seoul (KR); Sang-yu Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 105 days.

(21) Appl. No.: 11/451,654

(22) Filed: Jun. 13, 2006

(65) Prior Publication Data

US 2007/0014098 A1 Jan. 18, 2007

(30) Foreign Application Priority Data

Jul. 14, 2005 (KR) .................. 10-2005-0063925

(51) Int. Cl.
*G01D 11/28* (2006.01)
(52) U.S. Cl. .................. 362/97.3; 362/612; 362/561; 362/249.02; 362/800
(58) Field of Classification Search .................. 362/29, 362/612, 219, 220, 225, 236, 555, 231, 561, 362/97.1, 97.2, 97.3, 249.02; 349/61, 68
See application file for complete search history.

(56) References Cited

U.S. PATENT DOCUMENTS

| | | | |
|---|---|---|---|
| 4,491,863 A * | 1/1985 | Kurahashi | 348/799 |
| 4,920,409 A * | 4/1990 | Yamagishi | 348/791 |
| 5,767,837 A * | 6/1998 | Hara | 345/694 |
| 6,335,817 B1 * | 1/2002 | Phillipps | 359/290 |
| 6,856,087 B2 * | 2/2005 | Lin et al. | 313/500 |
| 7,270,425 B2 * | 9/2007 | Arai et al. | 353/87 |
| 2005/0169007 A1* | 8/2005 | Chou | 362/555 |
| 2006/0146463 A1* | 7/2006 | Martin | 361/91.1 |

FOREIGN PATENT DOCUMENTS

| | | |
|---|---|---|
| JP | 08211361 | 8/1996 |
| JP | 2004319458 | 11/2004 |
| KR | 20020047534 | 6/2002 |
| KR | 20040093533 | 6/2004 |

OTHER PUBLICATIONS

English Abstract of Publication No.: 08-211361.
English Abstract of Publication No.: 1020020047534.
English Abstract of Publication No.: 1020040093533.

* cited by examiner

*Primary Examiner*—Jong-Suk (James) Lee
*Assistant Examiner*—Leah S Lovell
(74) *Attorney, Agent, or Firm*—F. Chau & Associates, LLC

(57) ABSTRACT

A backlight unit is provided. The backlight unit includes a point light source circuit board and a point light source group row comprised of a plurality of point light source groups arranged in the point light source circuit board in a line. In addition, at least a part of the point light source groups have a different rotating angle with respect to each other.

18 Claims, 11 Drawing Sheets

BACKLIGHT UNIT AND LIQUID CRYSTAL DISPLAY HAVING THE SAME

CROSS-REFERENCE TO RELATED APPLICATION

This application claims the benefit of Korean Patent Application No. 2005-0063925, filed on Jul. 14, 2005, the disclosure of which is hereby incorporated by reference herein in its entirety.

BACKGROUND OF THE INVENTION

1. Technical Field

The present invention relates to a backlight unit and a liquid crystal display having the same, and more particularly, to a backlight unit and a liquid crystal display having the same in which the disposition of a point light source is adjusted to enhance the color uniformity of the backlight unit.

2. Discussion of the Related Art

Recently, flat panel display apparatuses, such as, for example, liquid crystal displays (LCDs), plasma display panels (PDPs), and an organic light emitting diodes (OLEDs), have been developed in place of a conventional displays such as cathode ray tubes (CRTs).

An LCD comprises, for example, an LCD panel having a Thin Film Transistor (TFT) substrate, a color filter substrate, and liquid crystals disposed therebetween. As an LCD panel does not emit light by itself, the LCD may comprise a backlight unit in the rear of the TFT substrate for providing light. The transmittance of the light from the backlight unit may be adjusted according to the alignment of the liquid crystals. The LCD panel and the backlight unit may be accommodated in a chassis.

A backlight unit may be considered either an edge type or a direct type backlight unit depending upon the location of the light source of the backlight unit. The edge type backlight unit provides the light source at a lateral side of a light guiding plate and is typically used for relatively small LCDs, such as those used in laptops and desktop computers. The edge type backlight unit provides a high light uniformity with good endurance and is suitable for use in thin profile LCDs.

However, as a result of the increasing demand for larger sized LCDs, the use of direct type backlight units for LCDs has likewise increased. The direct type backlight unit provides the entire surface of the LCD with light by disposing a plurality of light sources in the rear of the LCD panel. In addition, by utilizing a plurality of light sources, the direct type backlight unit may provide a high level of brightness for an LCD as compared with the edge type backlight unit. However, the level of brightness provided by conventional direct type backlight units is generally not sufficiently uniform.

The LED, which is a point light source, has been identified as a more suitable light source for use with the direct type backlight unit, in comparison to linear light sources such as e.g., lamps. The direct type backlight unit further includes a point light source row comprising a plurality of point light source groups, wherein the point light source groups provide white color light. These point light source groups are disposed on a point light source circuit board in a line.

However, the above conventional backlight units do not provide adequate color uniformity, due to a deviation of the characteristics of the colors emitted by the point light sources of the backlight unit. As a result, a user may see horizontal strips or vertical strips when viewing the LCD.

Thus, there is a need for a backlight unit having improved color uniformity.

SUMMARY OF THE INVENTION

According to an embodiment of the present invention, a backlight unit is provided. The backlight unit includes a point light source circuit board and a point light source group row comprised of a plurality of point light source groups arranged in the point light source circuit board in a line. Additionally, at least a part of the point light source groups have a different rotating angle with respect to each other.

According to an embodiment of the present invention, the difference of the rotating angle between the adjacent point light source groups is regular.

According to an embodiment of the present invention, the point light source group has been rotated to a regular direction.

According to an embodiment of the present invention, the difference of the rotating angle between the point light source groups in both end sides of the point light source group row is about 180 degrees.

According to an embodiment of the present invention, the rotating direction of the point light source groups is opposed with respect to the center of the point light source group row.

According to an embodiment of the present invention, the point light source groups in both end sides of the point light source group row have the same rotating angle.

According to an embodiment of the present invention, a plurality of adjacent point light source group rows are provided and are disposed in parallel to one another.

According to an embodiment of the present invention, the point light source groups disposed in the adjacent point light source group rows are disposed across from each other.

According to an embodiment of the present invention, the point light source group in one of the adjacent point light source group rows is disposed to be rotated and the point light source group in the other of the adjacent point light source group rows is disposed not to be rotated.

According to an embodiment of the present invention, the point light source group comprises a three point light source in which each of the three point light sources emits a different color from the other.

According to an embodiment of the present invention, the three point light source is disposed in the shape of a triangle.

According to an embodiment of the present invention, the point light source group comprises a blue point light source, a red point light source and a pair of green point light sources.

According to an embodiment of the present invention, the point light source group is disposed in the shape of a diamond in which a pair of the green point light sources are disposed opposite one another.

According to an embodiment of the present invention, the difference of the rotating angle between the adjacent point light source groups is about 180 degrees.

According to an embodiment of the present invention, a pair of the green point light sources are disposed along a disposition direction of the point light source group in series.

According to another embodiment of the present invention, a backlight unit is provided. The backlight unit includes a point light source circuit board and a plurality of point light source groups arranged in the point light source circuit board. Moreover, at least a part of the point light source groups have a different rotating angle with respect to each other.

According to another embodiment of the present invention, a liquid crystal display is provided. The liquid crystal display includes a liquid crystal display panel, a point light source circuit board disposed in the rear of liquid crystal display panel, and a point light source group row comprised of a plurality of point light source groups arranged in the point light source circuit board in a line. Also, at least a part of the point light source groups have a different rotating angle with respect to each other.

According to another embodiment of the present invention, a method for a disposition of a point light source is provided. The method includes providing a point light source circuit board and forming a plurality of point light source groups having different rotating angles with respect to each other and which are provided to arrange point light sources on the circuit board.

BRIEF DESCRIPTION OF THE DRAWINGS

Preferred embodiments of the present invention can be understood in more detail from the following descriptions taken in conjunction with the accompanying drawings of which.

DETAILED DESCRIPTION OF PREFERRED EMBODIMENTS

Figure 1:
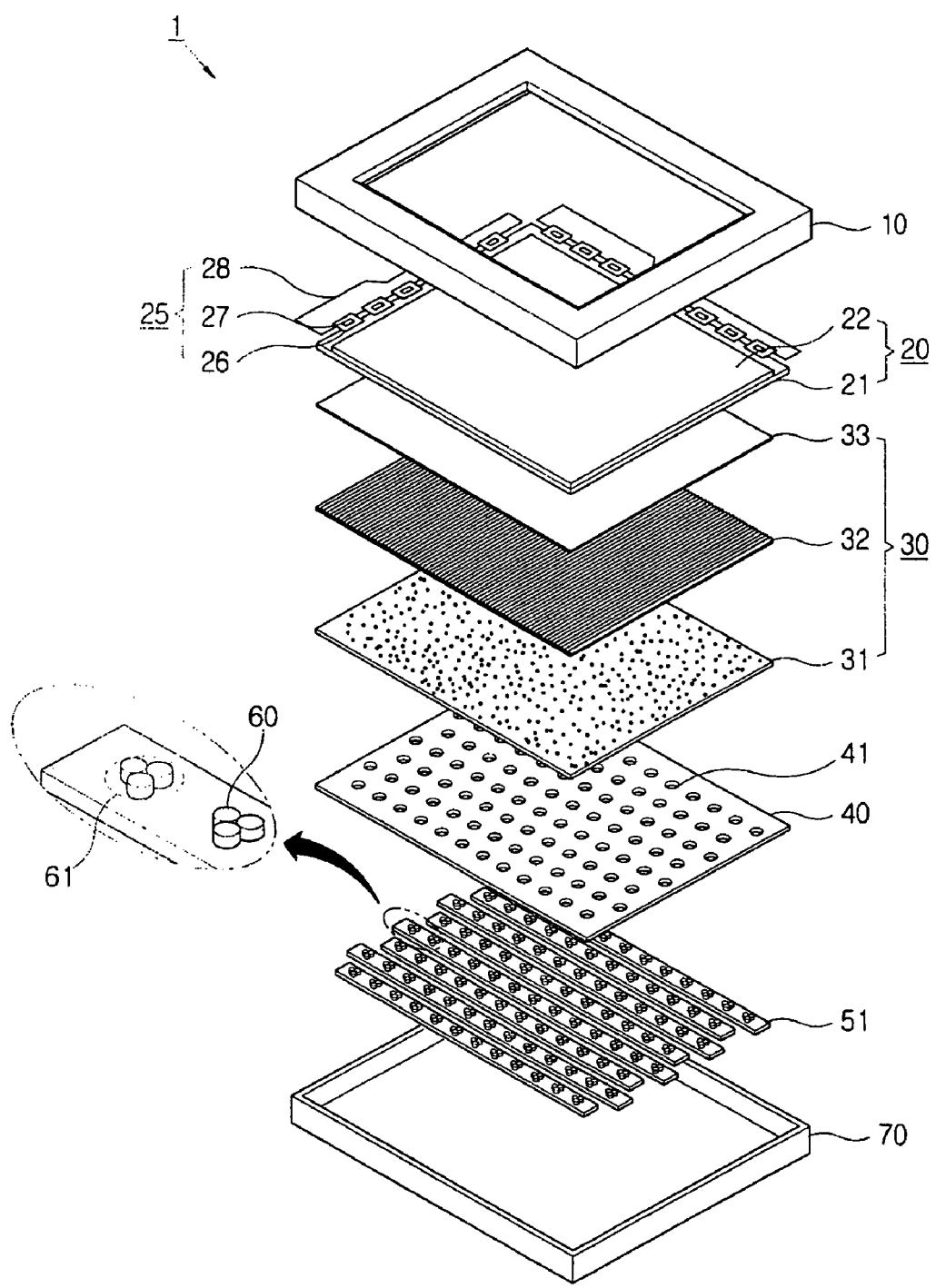
FIG. 1 is an exploded perspective view of a liquid crystal display according to a first embodiment of the present invention.

Preferred embodiments of the present invention will now be described more fully hereinafter below in more detail with reference to the accompanying drawings, in which preferred embodiments of the invention are shown. This invention may, however, be embodied in different forms and should not be construed as limited to the embodiments set forth herein.

The exemplary embodiments will be described using an LED as a point light source. However, the present invention may be applied to other types of point light sources as well.

Reference will now be made in detail to exemplary embodiments of the present invention, examples of which are illustrated in the accompanying drawings, wherein like reference numerals refer to like elements throughout.

A first embodiment of the present invention will be described with reference to the FIGS. 1 through 3.

Figure 2:
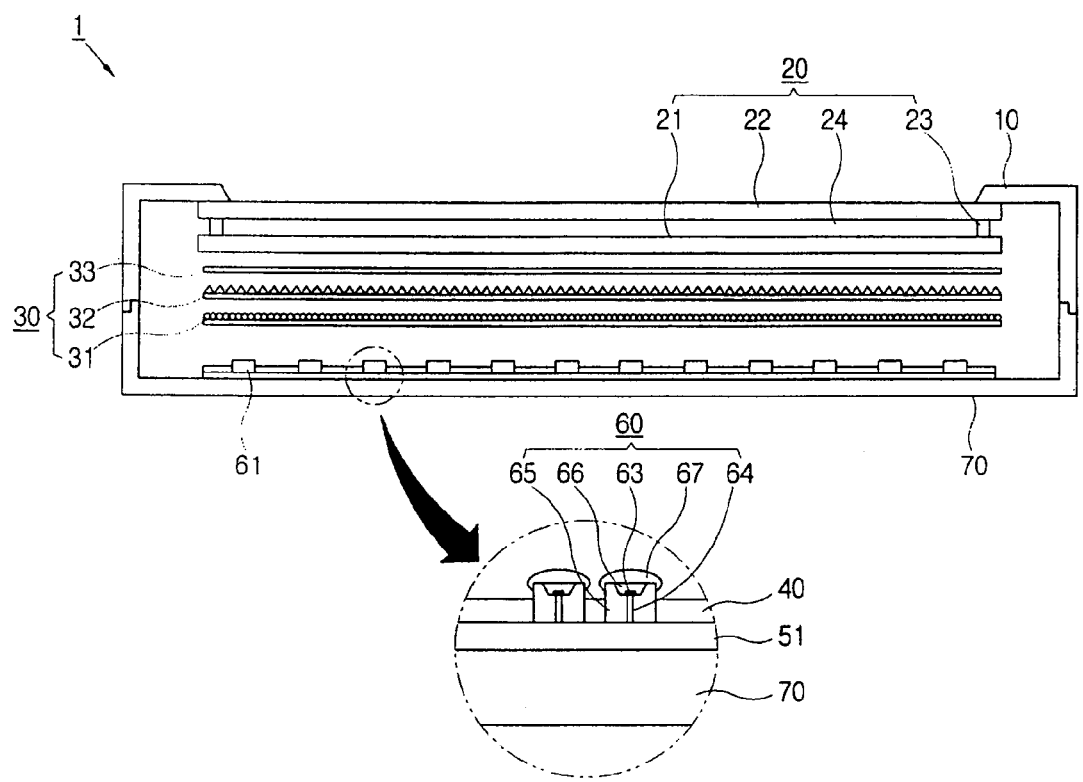
FIG. 2 is a sectional view of the liquid crystal display according to the first embodiment of the present invention.
Figure 3:
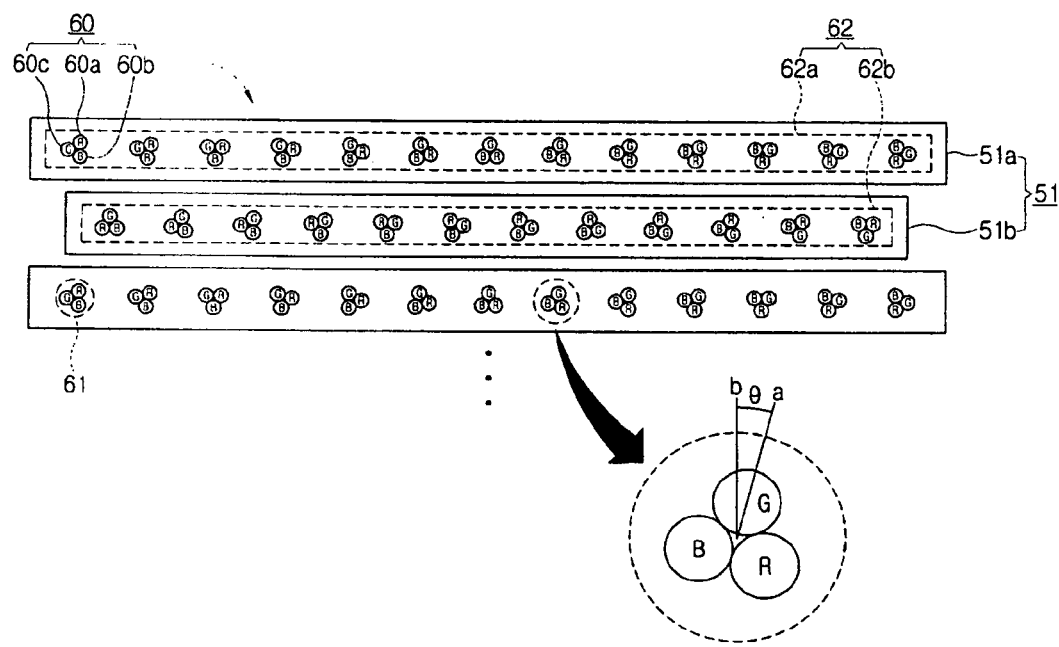
FIG. 3 is a view for illustrating a disposition of a light emitting diode according to the first embodiment of the present invention.

FIG. 1 is an exploded perspective view of a liquid crystal display according to the first embodiment of the present invention, FIG. 2 is a sectional view of the liquid crystal display according to the first embodiment of the present invention, and FIG. 3 is a view for illustrating a disposition of a light emitting diode according to the first embodiment of the present invention.

An LCD 1 comprises an LCD panel 20, a light regulating part 30, a reflecting plate 40, and an LED circuit board 51, which are disposed sequentially in the rear of the LCD panel 20. The LCD 1 further comprises one or more LED devices 60 seated on the LED circuit board 51 and disposed corresponding to an LED aperture 41 of the reflecting plate 40.

The LCD panel 20, the light regulating part 30, and the LED circuit board 51 are accommodated between an upper chassis 10 and a lower chassis 70.

The LCD panel 20 comprises a TFT substrate 21 on which TFTs are formed, a color filter substrate 22 facing the TFT substrate 21. The LCD panel 20 further includes a sealant 23 adhering the two substrates 21 and 22 and forming a cell gap, and a liquid crystal layer 24 encompassed by the two substrates 21 and 22 and the sealant 23. The LCD panel 20 according to the first embodiment is formed in the shape of a rectangle having a long side and a short side. Moreover, the LCD panel 20 controls alignment of the liquid crystal layer 24, thereby forming an image thereon. However, the LCD panel 20 is provided with light from the LED devices 60 disposed at its rear, because the LCD panel 20 does not emit light by itself.

On a side of the TFT substrate 21 is disposed a driving part 25 applying driving signals to the LCD panel 20. The driving part 25 comprises a flexible printed circuit (FPC) 26, a driving chip 27 seated on the flexible printed circuit 26, and a printed circuit board (PCB) 28 connected on a side of the flexible printed circuit 26. Here, the driving part 25 shown in FIG. 1 is a COF (chip on film) type. However, other types of driving parts may be used, such as, TCP (tape carrier package) or COG (chip on glass) type. Alternatively, the driving part 25 may be formed on the TFT substrate 21 where wirings are formed.

The light regulating part 30 disposed in the rear of the LCD panel 20 may comprise a diffusion plate 31, a prism film 32, and a protection film 33.

The diffusion plate 31 comprises a base plate and a coating layer having beads formed on the base plate. The diffusion plate 31 diffuses light from the LED devices 60, thereby improving the uniformity of the brightness of the LCD 1.

A triangular prism is placed on the prism film 32 in a predetermined alignment. The prism film 32 concentrates the light diffused from the diffusion plate 31 in a direction perpendicular to a surface of the LCD panel 20. Typically, two prism films 32 are used, and the micro prisms formed on the prism film 32 form a predetermined angle with respect to each other. The light passing through the prism film 32 progresses vertically, thereby forming a uniform brightness distribution. Furthermore, a reflective polarizing film may be used along with the prism film 32. Alternatively, in other embodiments, only the reflective polarizing film may be used without the prism film 32.

The protection film 33, positioned at the top of the light regulating part 30, protects the prism film 32, which may be vulnerable to scratching.

The reflecting plate 40 is placed on areas of the LED circuit board 51 in which the LED devices 60 are not seated. Also, one or more LED apertures 41 are formed in the reflecting plate 40 corresponding to the arrangement of LED devices 60 on the LED circuit board 51. In the present embodiment, the set of LED apertures 41 comprise eight parallel lines, with one line having thirteen LED apertures 41 and another line having twelve LED apertures 41 disposed at a regular interval. Accordingly, a pair of the aforementioned lines are provided in quartet. The LED apertures 41 between the adjacent lines are in staggered positions relative to each other. An LED device group 61 having three LEDs 60 is disposed in each LED aperture 41. The LED aperture 41 may be formed slightly bigger than the LED device group 61.

The reflecting plate 40 reflects the light delivered downward and directs the reflected light to the diffusion plate 31. The reflecting plate 40 may be made of, e.g., polyethylene terephthalate (PET) or polycarbonate (PC), and/or be coated with, for example, silver (Ag) or aluminum (Al). In addition, the reflecting plate 40 is formed with a sufficient thickness so as to prevent it from becoming distorted or shrinking due to heat generated from the LED devices 60.

In this embodiment, the LED circuit board 51 has an elongated bar shape, and eight LED circuit boards 51 are positioned in parallel at regular intervals. The lengthwise direction of each LED circuit board 51 is disposed in parallel with the long side of the LCD panel 20 which is in the shape of a rectangle. A relatively long LED circuit board 51a and a relatively short LED circuit board 51b are alternatively disposed. Because the LED device 60 may generate a significant amount of heat, the LED circuit board 51, may, for example be made, primarily of aluminum having an excellent thermal conductivity. The LCD 1 may further comprise a heat pipe, a radiating fin, a cooling fan, or other cooling mechanisms for removing the heat generated by the LED devices 60.

The LED devices 60, seated on the LED circuit board 51, are disposed across the entire rear surface of the LCD panel 20. The LED device 60 comprises a chip 63 for generating light, a lead 64 connecting the chip 63 with the LED circuit board 51, a plastic mold 65 accommodating the lead 63 and supporting the chip 63, silicon 66 and a bulb 67 which are disposed over the chip 63. The bulb 67 may be made of, for example, polymetamethylacrylate (PMMA).

Depending on the shape of bulb 67, the LED device 60 may be a side emitting type in which the light is mainly emitted to a lateral side of the LCD panel 20 or a top emitting type which the light is mainly emitted to the upper side of the LCD panel 20. The side emitting type provides a high color uniformity for the LCD 1 but a low brightness while the top emitting type provides a high brightness for the LCD 1 but a low color uniformity. According to some embodiments of the prevent invention, the disposition of the LED device 60 is changeable so that the color uniformity of the LCD 1 may be enhanced. Therefore, for example, a top emitting type of LED device 60 may be used to enhance the brightness of the LCD 1.

The LED device 60 includes an LED device group 61 and is disposed on the LED circuit board 51. The LED device group 61 comprises a red LED 60a, a green LED 60c, and a blue 60b LED. These LED device groups 61 comprising LEDs 60a, 60b, 60c are each disposed in a line on the LED circuit board 51 and form the shape of a triangle.

The LED device groups 61 disposed on the LED circuit board 51 are formed of an LED device group row 62. The device group row 62 includes LED device group row 62a and LED device group row 62b. LED device group row 62a is disposed on long LED circuit board 51a and comprises the thirteen LED device groups 61. LED device group row 62b is disposed on the short LED circuit board 51b and comprises the twelve LED device groups 61. In the LED device group row 62, the LED device groups 61 are disposed at regular intervals. Moreover, the LED device groups 61 of the adjacent LED device group rows 62 are disposed across from each other.

Referring to FIG. 3, a disposition for the LED device 60 in the LED device group row 62 is described as follows.

In the LED device groups 61 disposed in the LED device group row 62a, each rotating angle θ of the adjacent LED device groups 61 is different. The rotating angle θ expresses a rotating degree of the LED device group 61. The rotating angle θ, is defined, for example, as an angle between a connecting line 'a' and a perpendicular line 'b'. Herein, the connecting line 'a' is the line between the center of the LED device group 61 and the center of the green LED 60c, and the perpendicular line 'b' is a line which is perpendicular to an elongated direction of the LED device group row 62. Each rotating angle θ of the adjacent LED device groups 61 is different so that the adjacent LED device groups 61 do not overlap each other from a parallel shift.

The LED device group 61 disposed in the LED device group row 62a has been rotated in a clockwise direction along the LED device group row 62b from the left side to the right side. The difference of the rotating angle θ between the adjacent LED device groups 61 is regular. The LED device group 61 rotates at an angle of about 15 degrees so that the difference of the rotating angle of 15×(13−1), e.g. 180 degrees, occurs between the LED device group 61 disposed on both end sides of the LED device group row 62a. In other words, the LED device groups 61 disposed on both end sides of the LED device group row 62a are symmetrical with respect to the center point of the LED device group row 62.

Also, the LED device group 61 disposed on the LED device group row 62b has been rotated in a clockwise direction along the LED device group row 52b from the left side to the right side, and the sum of the rotating angle is about 180 degrees.

The directions of the LEDs 60a, 60b and 60c of each LED device group 61 may be varied by rotating the LED device group 61 to prevent these LED groups 61 from focusing only one color in only one direction. Reference will now be made in detail to the red LED 60a.

The red LED 60a faces upward on the left side of the LED device group row 62b. However, the more the LED device 60 goes toward the right side, the more the red LED 60a rotates in clockwise direction. Finally, the red LED 60a faces downward on the right side of the LED device group row 62b. A user best recognizes a light which is emitted from the red LED 60a among the three LEDs 60a, 60b, 60c. Therefore, a user may recognize the red LED 60a disposed in a line as strip lines. In this embodiment of the invention, the direction of the red LED 60a is varied in the LED device group row 62 so that the there is a decrease in the occurrence in which a user recognizes the red LED 60a line.

On the other hand, the color is not uniform with respect to user's visual angle if the LED device groups 61 are not rotated so that the LED device groups 61 have the same rotating angle as one another. Otherwise, for example, a user may recognize a greenish color in the left side while a user may recognize a reddish color in the right side. In the present embodiment of the invention, the rotating angle θ is varied so that the aforementioned matter may be decreased.

In the present embodiment of the invention, all the LED device group row 62 are rotated in the same directions. However, some LED device rows 62 can be rotated in different directions. For example, one of the adjacent LED device group rows 62 rotates in a clockwise direction and the other may rotate in a counter-clockwise direction.

Further, in this embodiment of the present invention, the rotating angle θ of the respective LED device groups 61 is regular, but can also be irregular.

Figure 4:
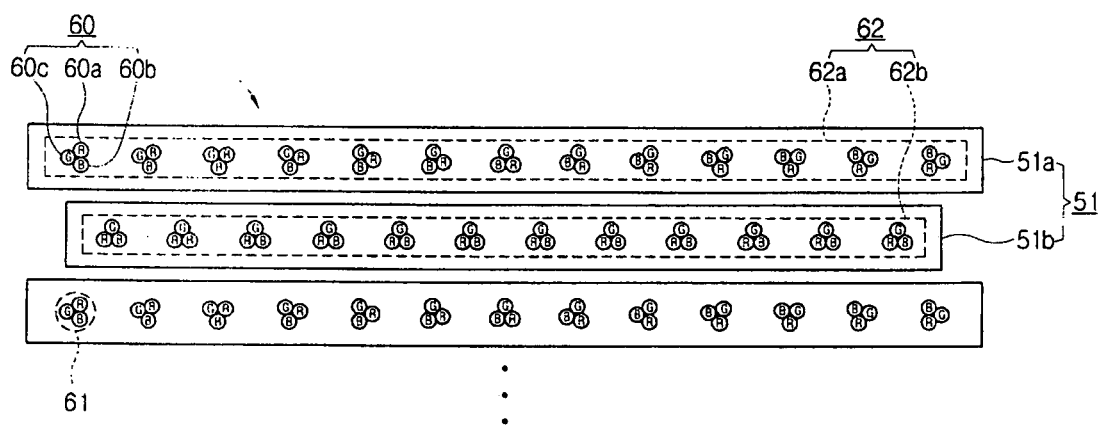
FIGS. 4 through 11 are views for illustrating a disposition of a light emitting diode according to a second embodiment through a ninth embodiment of the present invention.

FIG. 4 is a view for illustrating a disposition of a light emitting diode according to a second embodiment of the present invention.

The LED device group 61 disposed on the LED device group row 62a has been rotated such as in the previous embodiment. However, the LED device group 61 disposed on the LED device group row 62b has not been rotated.

If the LED device group row 62a comprises the thirteen LED device groups 61, each of the thirteen LED device groups 61 rotates at about 180/(13−1), e.g. about 15 degrees so as to have a sum for the rotating angle of about 180 degrees.

On the other hand, if the LED device group row 62b comprises the twelve LED device groups 61, each of the twelve LED device groups 61 rotates at about 180/(12−1), e.g. about 16.3636... degrees so as to have a sum for the rotating angle of about 180 degrees. Hence, the rotating angle is not a positive number. In this case, the design of the LED circuit board 51 may have been complex. In the present embodiment of the invention, the LED device group 61 disposed on the short LED circuit board 51*b* has not been rotated so as to avoid the complex design of the LED circuit board 51. However, the brightness is improved because the LED device group 61 disposed on the long LED circuit board 51*a* has been rotated.

Figure 5:
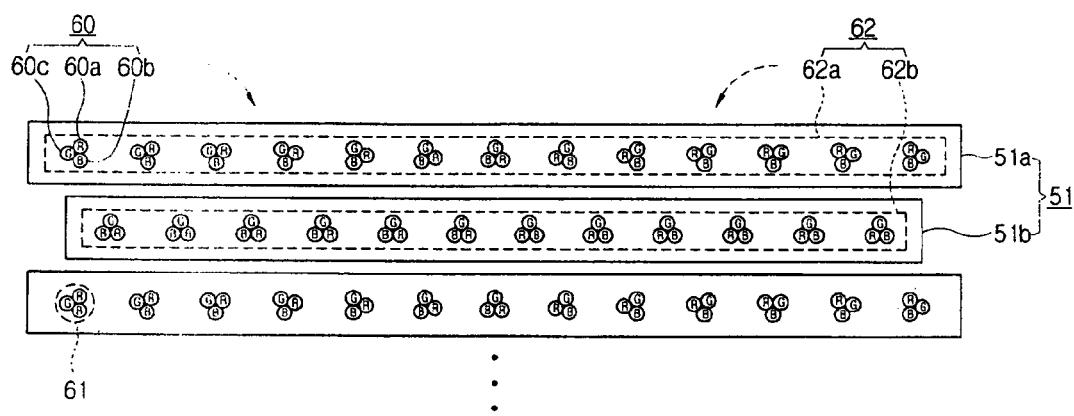

FIG. 5 is a view for illustrating a disposition of an LED according to a third embodiment of the present invention.

The rotating direction of the opposing LED device groups 61 is opposite with respect to the center of the LED device group row 62. In other words, the left side of the LED device group row 62*a* has been rotated in a clockwise direction and the right side of the LED device group row 62*b* has been rotated in a counterclockwise direction. The center of the LED device group row 62*a* having an odd number of the LED device groups 61 is the center of the seventh of the LED device groups 61. Additionally, the center of the LED device group row 62*b* having an even number of the LED device group 61 is the center of the sixth and seventh of the LED device groups 61.

According to this embodiment of the present invention, the LED device 60 may be disposed having a bilateral symmetry. On the other hand, however, the red LEDs 60*a* disposed in the center portion of the LED device group row 62*b* may cause the color uniformity of an LCD to decrease. Here, in the present embodiment, an interval between the LED device 60 and the LCD panel 20 is adjusted to prevent the color uniformity of the LCD from decreasing.

Figure 6:
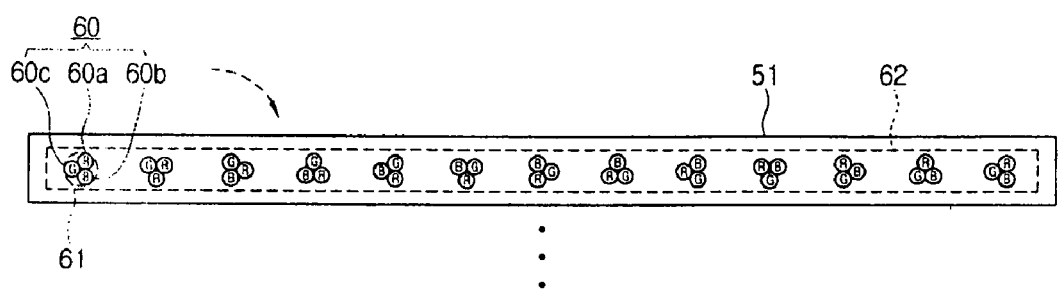

FIG. 6 is a view for illustrating a disposition of an LED according to a fourth embodiment of the present invention.

The rotating angle of the LED device group 61 is about 30 degrees, and the sum of the rotating angle of the LED device groups 61 in the LED device group row 62 is about 360 degrees. Therefore, the LED device groups 61, which are disposed in both end sides of the LED device group row 62, have the same rotating angle.

In this embodiment of the present invention, all the LED device group rows 62 have the same sum for the rotating angle, but in other embodiments, the LED device group rows 62 may each have a different sum for the rotating angle.

Figure 7:
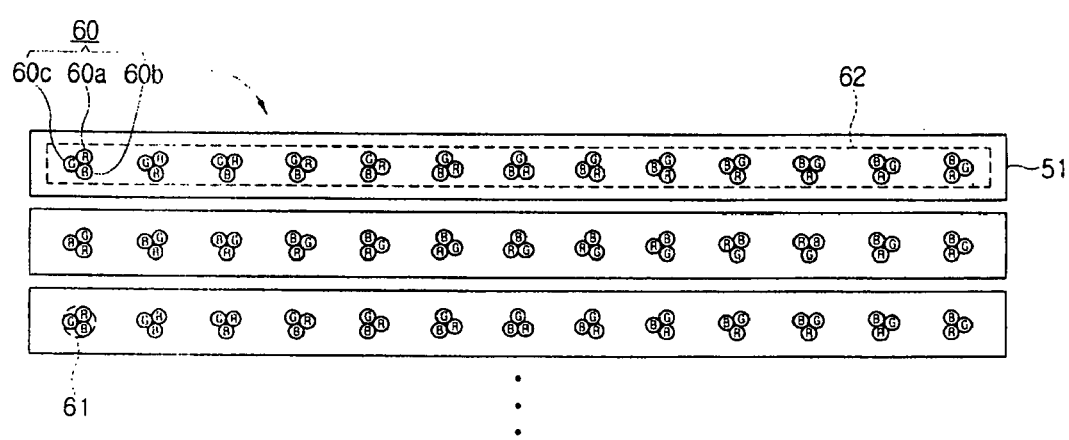

FIG. 7 is a view for illustrating a disposition of an LED according to a fifth embodiment of the present invention.

In this embodiment of the present invention, all the LED circuit board 51 have the same length and the same number of LED device groups 61 disposed there. Also, each of the LED device groups 61 belonging to one of the adjacent the LED device group rows 62 are disposed to correspond to a respective LED device group 61 belonging to the other adjacent LED device group row 62. In addition, the LED device groups 61 which correspond to each other in the adjacent LED device group rows 62 also have a different rotating angle from one another.

Figure 8:
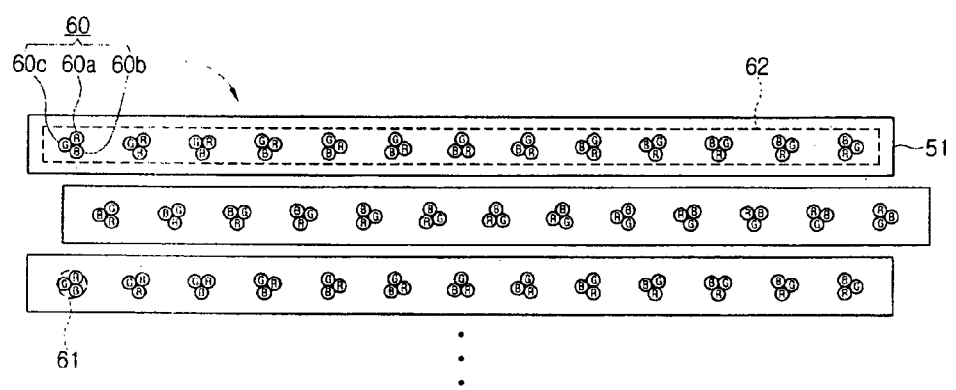

FIG. 8 is a view for illustrating a disposition of an LED according to a sixth embodiment of the present invention.

The LED circuit board 51 has a same length and the same number of LED device groups 61 disposed thereon. The sum of rotating angle of each of the LED device group rows 62 is the same with an angle of about 180 degrees. The adjacent LED circuit boards 51 are disposed across from each other and thus the LED device groups 61 disposed on the LED device group rows 62 are also disposed across from each other.

Figure 9:
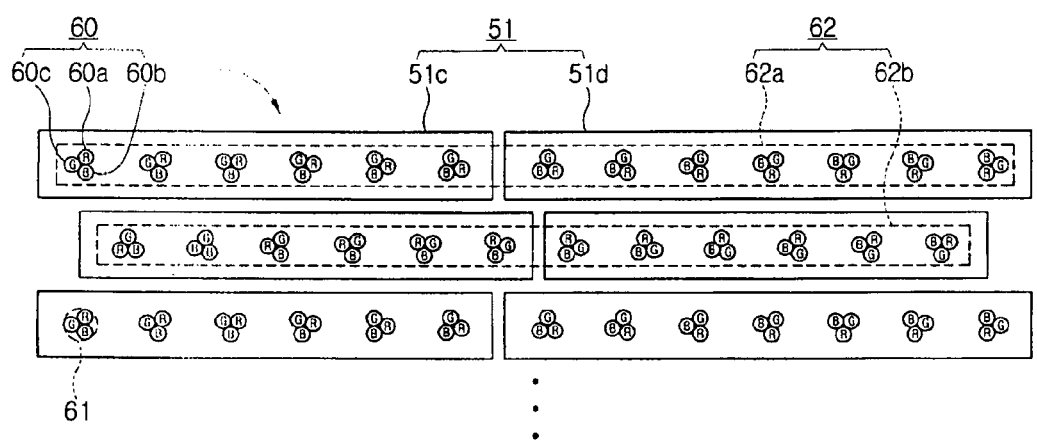

FIG. 9 is a view for illustrating a disposition of an LED according to a seventh embodiment of the present invention.

The disposition of each LED device group row 62*a*, 62*b* and the number of the LED device group 61 are the same as the first embodiment of the present invention. However, in the present embodiment, the respective LED device group rows 62*a*, 62*b* are disposed on two of the LED circuit boards 51*c*, 51*d*. As the size of the LCD 1 gets larger, the length of the LED circuit board 51 gets larger. If the LED device group rows 62*a*, 62*b* are disposed on a plurality of the LED circuit boards 51*c*, 51*d*, the length of the LED circuit board 51 may be decreased. Therefore, the manufacturing and handling of the LED circuit board 51*c*, 51*d* is simplified.

Figure 10:
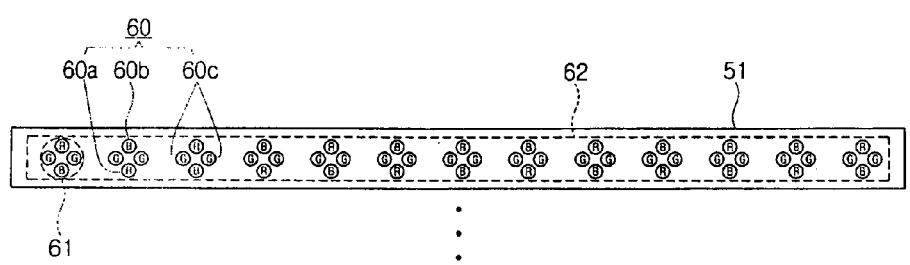

FIG. 10 is a view for illustrating a disposition of an LED according to an eighth embodiment of the present invention.

The LED device group 61 comprises one red LED 60*a*, one blue LED 60*b* and a pair of green LEDs 60*c*. The LEDs 60*a*, 60*b*, 60*c* have been disposed in the shape of a diamond, in which a pair of the green LEDs 60*b* are disposed opposite each other.

The difference of the rotating angle between the adjacent LED device groups 61 is about 180 degrees. Therefore, a pair of the green LEDs 60*c* are disposed along an elongated direction of the LED device group row 62 in series while each of the red LED's 60*a* and the blue LED's 60*b* are disposed with their positions relative to one other alternating along the LED device group row 62.

Figure 11:
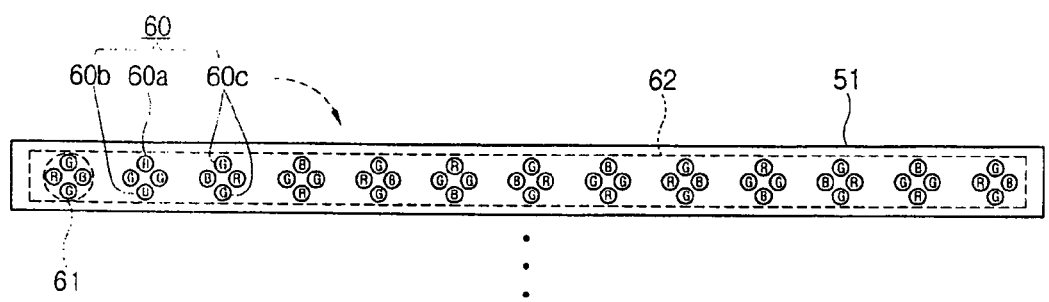

FIG. 11 is a view for illustrating a disposition of an LED, according to a ninth embodiment of the present invention.

The LED device group 61 comprises one red LED 60*a*, one blue LED 60*b* and a pair of the green LEDs 60*c*. The LEDs 60*a*, 60*b*, 60*c* have been disposed in the shape of a diamond, in which a pair of the green LEDs 60*b* are disposed opposite to each other.

The rotating angle between the adjacent LED device groups 61 is about 90 degrees. Therefore, a pair of the green LEDs 60*c* are disposed along an elongated direction of the LED device group row 62 in series with their positions relative to each other alternating along the device group row 62. *a*.

In aforementioned embodiments, the LED device group 61 comprises three LEDs 60 or four LEDs 60. However, the present invention is not limited aforementioned embodiments. Also, the color composition of the LED 60 in the LED device group 61 may be different from the above described embodiments of the present invention.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A backlight unit comprising:
    a point light source circuit board; and
    a plurality of point light source group rows comprising a plurality of point light source groups arranged in the point light source circuit board in a line, wherein at least a part of the point light source groups have different rotating angles with respect to each other, and
    the point light source groups within at least one point light source group row are gradually rotated by an angle of 180×M/(N−1) from one end to the other end of the same point light source group row, M and N being natural numbers, and N being the number of the point light source groups arranged within the same point light source group row.

2. The backlight unit according to claim 1, wherein a difference of the rotating angle between adjacent point light source groups is regular.

3. The backlight unit according to claim 1, wherein the rotational direction of the point light source group is regular.

4. The backlight unit according to claim 3, wherein a difference of the rotating angle between the point light source groups on both end sides of the at least one point light source group row is about 180 degrees.

5. The backlight unit according to claim 1, wherein the rotating direction of the point light source groups is opposed with respect to a center of the at least one point light source group row.

6. The backlight unit according to claim 5, wherein the point light source groups on both end sides of the at least one of the plurality of point light source group rows have the same rotating angle with respect to each other.

7. The backlight unit according to claim 1, wherein the plurality of adjacent point light source group rows are disposed in parallel to one another.

8. The backlight unit according to claim 7, wherein the point light source groups disposed in the adjacent point light source group rows are disposed across from each other.

9. The backlight unit according to claim 7, wherein a point light source group in one of the adjacent point light source group rows is disposed to be rotated and a point light source group in another of the adjacent point light source group rows is disposed not to be rotated.

10. The backlight unit according to claim 1, wherein the point light source group comprises a three point light source in which each of the three point light sources emits a different color from the other.

11. The backlight unit according to claim 10, wherein the three point light source is disposed in the shape of a triangle.

12. The backlight unit according to claim 1, wherein the point light source group comprises a blue point light source, a red point light source and a pair of green point light sources.

13. The backlight unit according to claim 12, wherein the point light source group is disposed in the shape of a diamond and in which the pair of the green point light sources are disposed opposite each other.

14. The backlight unit according to claim 13, wherein a difference of the rotating angle between adjacent point light source groups is about 180 degrees.

15. The backlight unit according to claim 13, wherein a pair of the green point light sources are disposed along an elongated direction of the point light source group in series.

16. A backlight unit comprising:
a point light source circuit board; and
a plurality of point light source groups arranged in the point light source circuit board in a line, wherein at least a part of the point light source groups have different rotating angles with respect to each other, and
the point light source groups are gradually rotated by an angle of $180 \times M/(N-1)$ from one end to the other end of the same line, M and N being natural numbers, and N being the number of the point light source groups arranged within the same line.

17. A liquid crystal display comprising:
a liquid crystal display panel;
a point light source circuit board disposed in the rear of the liquid crystal display panel; and
a plurality of point light source group rows comprising a plurality of point light source groups arranged in the point light source circuit board in a line, wherein at least a part of the point light source groups have different rotating angles with respect to each other, and
the point light source groups within at least one point light source group row are gradually rotated by an angle of $180 \times M/(N-1)$ from one end to the other end of the same point light source group row, M and N being natural numbers, and N being the number of the point light source groups arranged within the same point light source group row.

18. A method for a disposition of a point light source comprising:
providing a point light source circuit board; and
forming a plurality of point light source groups having different rotating angles with respect to each other and which are provided to arrange the point light source groups on the circuit board in a line,
wherein the point light source groups are gradually rotated by an angle of $180 \times M(N-1)$ from one end to the other end of the same line, M and N being natural numbers, and N being the number of the point light source groups arranged within the same line.

* * * * *